Nov. 25, 1969 H. BAUR ET AL 3,480,732
CHARGE ACCUMULATION SYSTEM FOR TELEPHONE INSTALLATIONS
Filed June 27, 1966
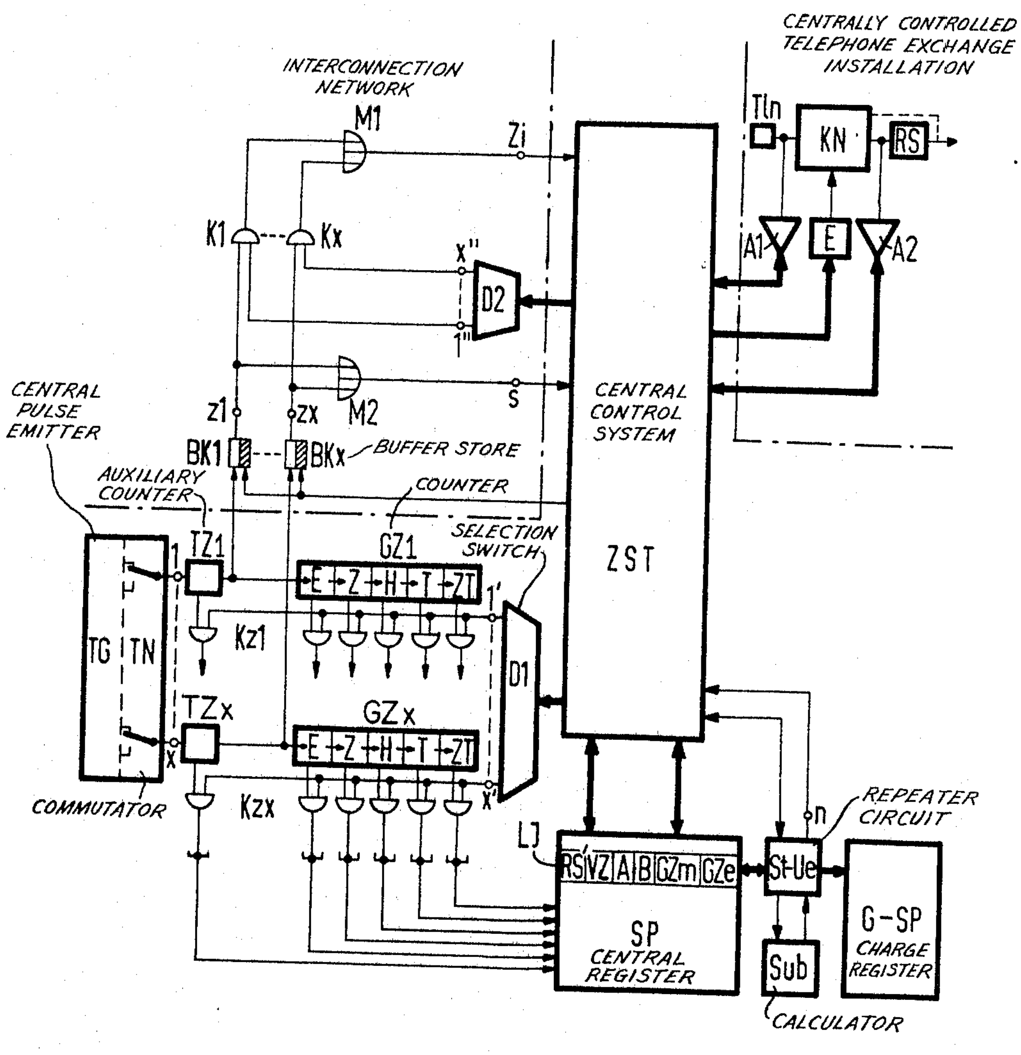

3,480,732
Patented Nov. 25, 1969

3,480,732

CHARGE ACCUMULATION SYSTEM FOR TELEPHONE INSTALLATIONS

Hans Baur, Munich, and Hartmut Fabianke, Munich-Solln, Germany, assignors to Siemens Aktiengesellschaft, Munich, Germany, a corporation of Germany Filed June 27, 1966, Ser. No. 560,622
Claims priority, application Germany, July 1, 1965, S 97,934
Int. Cl. H04m *15/18, 15/22*
U.S. Cl. 179—7.1 15 Claims

ABSTRACT OF THE DISCLOSURE

System for accumulating charges for call connections in a telephone system in which cyclic pulses of faster repetition rates are used for greater distances. These pulses are counted in separate central zone counters for the several distance zones, and the difference between the count upon initiation and upon termination of the call is determined, to calculate the total charge units accumulated during the call.

CROSS REFERENCE TO RELATED APPLICATION

Applicants claim priority from corresponding German application Ser. No. S 97,934, filed July 1, 1965.

GENERAL DESCRIPTION

This invention relates to a charge accumulation system for telephone installations, and, more particularly, to a charge accumulation system for calculating the cost or charge for a telephone call connection completed in response to the demand of a calling subscriber, and based both upon the distance of the connection from the calling to the called subscriber and the duration of the connection.

The system of the invention provides for accumulating the charge of each such call connection and registering the total charge thereof in charge accumulation registers associated both with an individual subscriber station and with a central system, such as a central telephone exchange installation with which the calling subscriber is connected.

In accordance with a preferred embodiment of the invention, there is provided a central pulse emitter which generates control pulses of different pulse repetition rates in accordance with different distance zones of possible call connections. The control pulses, in accordance with the respective repetition rates thereof, are supplied as counting pulses to respectively associated central zone counters which individually correspond to each such distance zone. Each such counting pulse, regardless of the distance zone with which it is associated, represents one charge unit. Thus, for a greater distance connection, a higher pulse repetition rate is provided, resulting in a more rapid accumulation of charge units for the call connection, in accordance with a higher charge rate per unit time.

A central control system is provided which responds to and identifies each calling subscriber and the route of the call connection demanded by the calling subscriber. There is further provided a central register which registers various information identifying each call connection. In response to each demand for a call connection by a calling subscriber, the central control system causes the central register to register information identifying the calling subscriber, the distance zone of the demanded call connection, and, when the connection is established, the current count accumulation of the corresponding central zone counter. The central register may also register the number of the called subscriber. When the call connection is terminated, the central register further registers the then current count accumulation of the corresponding central zone counter. The charge units for a given call connection therefore may be determined by subtraction of one of the accumulated values from the other, as derived from the corresponding central zone counter for the given call connection. The counting pulses therefore are produced for accumulation in central zone counters common to all connection lines of the given distance zone, and not for accumulation by registers assigned to individual external connection lines of the installation. Thus, the total accumulated count of each zone counter is independent of the seizure conditions of the individual external connection lines and, rather, indicates at any time the total number of counting pulses accrued for a given distance zone.

The provision of counting pulses or control pulses having different pulse repetition rates in accordance with the distance zones of call connections is preferable to the measuring of the actual time duration of the connection. A direct time measurement system requires only a single time accumulation register; however, the time duration measurements must be converted in accordance with the distance of each call connection to determine the corresponding charge units. In accordance with the system of the invention, the charge units accumulated by all central zone counters may represent the same monetary value regardless of the distance zone. Calculation of charges is therefore greatly simplified. Accumulation of charge units in this manner also facilitates the continuous accumulation of charge units at individual subscriber charge registers.

A further advantage of charge unit accumulation, in accordance with the system of the invention, comprises the ease with which charge rates may be varied for calls in a given or a plurality of distance zones. For example, the call costs per unit time, such as between day and night rates, may readily be changed. The inputs of the central zone registers are commutated from a first to a second set of outputs of the central pulse emitter for deriving counting pulses having pulse repetition rates in accordance with the day or night charge rates for calls of the corresponding distance zones.

The central cost accumulating system provides accurate cost accumulation by responding to and counting both charge units and fractions of a charge unit. For this purpose, the central pulse emitter may produce control pulses having a repetition rate of a factor ($n$) greater than the pulse repetition rate of the counting pulses for actuating the respectively associated central zone counters. Each central zone counter includes an "$n$-step" auxiliary counter and a whole charge unit counter. The "$n$-step" auxiliary counter is provided for receiving and accumulating the control pulses from the central pulse emitter and for producing, in response to ($n$) input pulses, a counting pulse which is applied to the whole charge unit counter of the central zone counter of the associated distance zone. The count accumulations of both the auxiliary "$n$-step" and the whole charge unit counter of each central zone counter are registered by the central register both at the beginning and the end of each call connection, whereby the accumulated charge units of a given call connection may be calculated to include the number of complete charge units and the $n$th part of a further charge unit.

In accordance with each of the foregoing embodiments, there is additionally provided a central charge accumulation register which may register for each call connection appropriate information relating to each calling subscriber for billing purposes. The register information may include the number of the called subscriber and actual charge of each call connection demanded by a calling subscriber associated with the central system. Calculating means may be provided for determining the actual charges from the charge units accumulated for each charge connection by the central register.

The system of the invention also readily provides for the operation of charge indicators at the individual subscribed stations. The counting pulses generated for accumulation by the central zone counters may also be utilized directly for transmitting counting pulses to charge accumulation registers at individual subscriber stations.

In accordance with a first embodiment of the invention, the transmission of counting pulses to the individual subscriber charge accumulation registers is effected as follows. For each counting pulse, the central control system scans, in sequence, the line address information of all lines seized in a call connection as registered in the central register. The central control system thereby identifies each seized connection line having a zone identification address corresponding to that of each received counting pulse. The central control system thereupon produces a command pulse which controls a connection network to transmit a counting pulse to the charge accumulation register of the individual subscriber station connected to each such seized connection line.

In an alternative embodiment of the invention for effecting charge accumulation at individual subscriber registers, the central control system may transmit the zone identification registered with the address information of each line seized in a call connection to a decoder, in response to each counting pulse from the central pulse emitter. Upon coincidence of a counting pulse of a given distance zone with the zone identification registered for a call connection, the address information of the line seized in the connection is transmitted, with a control command pulse, by the central control system to the connection network. The connection network thereupon completes a connection for the transmission of the counting pulse to the individual subscriber accumulation register.

The twofold utilization of the counting pulses for effecting the count accumulation of the central zone counting registers and the individual charge indicators associated with each subscriber station provides that both the central zone and the individual subscriber registers may effect an accumulation in a step-by-step or sequential manner for each accrued charge unit throughout the duration of a call connection. Thus, a subscribed may continuously check the cost for a call connection as the charge units accrue.

The equipment required for the central charge accumulation and that required for providing continuous charge accumulation at individual subscriber charge accumulation registers, in accordance with either of the described embodiments of the latter, is provided at a minimum additional cost to a telephone exchange installation. The system of the invention is particularly adaptable for use with a centrally controlled telephone exchange installation; thus, the switching and control systems required in such an exchange installation for establishing call connections may also perform the control and scanning functions required for the charge accumulation system of the invention. For example, transmission of information for registration in the central register, including recognition of establishment and completion of call connections and the identity of the calling and called subscribers, may be performed by the central control system in coordination with the operations thereof for establishing and subsequently terminating the call connection. Further, the central control system may perform the cyclical scanning or testing of the line address information registered in the central register for determining the coincidence of zone identification information of registered line addresses seized in established call connections with the zone identification of each counting pulse. Upon recognization of such coincidence, the central control system may produce command pulses for establishing connection paths to transmit counting pulses to the individual subscriber cost accumulation registers.

PRIOR ART

Various systems have been provided in the prior art for effecting cost or charge accumulation for telephone exchange installations. In accordance with prior art time pulse counting systems, individual counting pulses are produced during an established call connection at regular time intervals and conveyed to charge registers assigned to the calling subscriber. The charge registers typically comprise meters for indicating the accumulated count of the individual counting pulses.

The individual counting pulses are produced by a central pulse emitter including zoning means associated with call connections of different distances and a time pulse emitter. The pulse repetition rates of the counting pulses are determined in accordance with the distance of the call connections. Thus, charge units are accumulated at a more rapid rate in accordance with a higher cost per unit time for a call of a greater distance than for a call of a shorter distance. For a given call connection, a central system connects a counting pulse transmitter into the connection line which responds to the pulse output of the zoning means and the time pulse emitter to generate and transmit counting pulses to an individual subscriber charge accumulation register. The counting pulses are also accumulated at a central charge or count accumulation register, and registered therein in accordance with the identification of the subscriber connected to a seized connection line. Each counting pulse comprises a charge unit, and from the total charge units accumulated upon termination of a given call, the charge of the call may readily be determined. Alternatively, the accumulated value may itself represent the actual charge, rather than the number of charge units.

The prior art time pulse counting systems therefore provide that the counting pulses may be utilized both for controlling central charge accumulation registers, located at the central telephone installation, and also for directly controlling charge accumulation registers at the individual subscriber stations. Continuous cost accumulation during the existence of a call connection is therefore provided at individual subscriber cost accumulation registers; however, this is achieved only through the use of complex control systems and results in heavy transmission loads on the connection lines employed in the call connection. Further, time pulse counting systems require the use of counting registers associated with or assigned to individual connection lines in accordance with the seizure thereof in a given call connection.

Another prior art system for charge accumulation for telephone call connections depends directly on determination of the time duration of seizure of a connection line from establishment to completion of a call connection and the distance between the calling and the called subscribers. Time duration cost accumulation systems are readily adaptable for use with telephone exchange installations which are controlled centrally and wherein the exchange installation includes registers for indicating and identifying the state of the system, such as existing call connections and the like. An advantage of such systems is that it is not necessary to transmit counting pulses over the connection lines and thereby the transmission load on the connection lines, and the complexity of the control systems for effecting transmission over the latter, are considerably reduced. The calling subscriber may be informed of the total charge of a call connection, after completion of the call and of the accumulation of the charge. However, continuous cost accumulation indication at a subscriber station in a time duration system can be provided only with the addition of considerable circuit equipment and resultant increased cost of the installation. Further, such time duration cost accumulation systems require additional conversion means for determining charge units in calculating the actual cost of a call connection for the measured time duration thereof and for the distance thereof. Thus, commutation of the charge rates, for example from day to night rates, requires complex commutation control systems.

OBJECTS OF THE INVENTION

These and other defects and objections of prior art charge accumulation systems are overcome by the charge accumulation method and system of the invention. Continuous charge accumulation is effected both at the central zone registers, in accordance with a given distance zone, and for all call connections established for calling subscribers associated with the installation, and at individual subscriber charge accumulation registers.

Since the charge accumulation at the central zone register is effected independently of the seizure of individual call connection lines, burdening of the connection lines due to transmission loads as in prior art time pulse counting systems is avoided. The charge accumulation system of the invention requires a minimum of components and is efficient in operation, and therefore is low in cost. Further, the control system of a centrally controlled telephone exchange installation may be employed for providing the necessary controls and circuit connections to effect charge accumulation in accordance with the system of the invention, resulting in minimum additional cost of the central telephone exchange installation.

It is therefore an object of this invention to provide an improved charge accumulation method and system for a telephone installation.

A further object of this invention is to provide an improved charge accumulation method and system for a telephone installation providing for charge accumulation simultaneously at central zone registers of the exchange installation and at individual subscriber registers of individual subscriber stations associated with the installation.

Still another object of this invention is to provide a charge accumulation system and method for a telephone installation operable in accordance with a central control system of a telephone exchange installation.

Still a further object of the invention is to provide a charge accumulation method and system wherein the accumulation of charge units for call connections at the central installation is effected in accordance with distance zones and independently of any individually seized connection line associated with a given call connection.

Another object of this invention is to provide a charge accumulation method and system for a telephone exchange installation operable in accordance with a central control system thereof to provide continuous accumulation of charge units simultaneously at the telephone exchange installation and at individual subscriber accumulation registers and which provides for commutation of the charge rate for call connections of given distance zones.

Still a further object of this invention is to provide an improved charge accumulation system and method for a telephone exchange installation which is of reduced complexity and lower cost than systems provided heretofore in the prior art and which provides for the continuous accumulation of charge units simultaneously at a central register of the installation and at individual subscriber charge accumulation registers associated with individual subscriber stations.

These and other objects of this invention will become apparent as the following description proceeds.

DESCRIPTION OF THE INVENTION

The single drawing shows, in block diagram form, the charge accumulation system of the invention including components of a centrally controlled telephone exchange installation with which the charge accumulation system is operable. More specifically, the upper-right portion of the drawing, set off by alternate dash-and-dot perpendicular lines, includes components of a centrally controlled telephone exchange installation. The upper-left portion, set off by alternate dash-and-dot perpendicular lines, includes components of an interconnection network in accordance with the invention for transmitting counting pulses to individual subscriber charge accumulation registers associated with individual subscriber stations. The remainder of the drawing shows further components of the charge accumulation system of the invention.

The components of the central telephone exchange installation shown in the upper-right portion of the drawing includes a subscriber circuit T*ln* which represents one of a plurality of such subscriber stations associated with the installation. A coupling network KN and a connection set RS are shown connected in circuit with subscriber station T*ln* for completing a call connection demanded by the subscriber. It will be understood that a number of the coupling networks KN and connection sets RS are provided for the installation in accordance with the required traffic handling capability thereof, only one of each such systems being shown for purposes of clarity. Similarly, there are provided a plurality of supervision sets indicated by the single supervision set A1 connected to subscriber station T*ln* and the single supervision set A2 connected between the coupling network KN and connection set RS. There is further provided a setting system E for the coupling network KN. Each of the sets A1 and A2 and the setting system E is connected over respectively associated signal channels to a central control system ZST. The system ZST comprises part of the charge accumulation system of the invention, but may be provided by the central control system of the telephone exchange installation.

The charge accumulation system of the invention further includes a central pulse emitter TG and a commutator TN. The central pulse emitter TG includes, in a well known manner, a time pulse generator and zone defining means whereby a plurality of trains of pulses of different predetermined pulse repetition rates are produced at the output terminals 1 . . . $x$ of the combined emitter TG and commutator TN.

The commuator TN includes selectively operable switches, as indicated in connection with the output terminals 1 . . . $x$ for selecting different pulse repetition rates for the respectively associated distance zones as represented for the terminals 1 and ($x$). The variation in rates for a given distance zone typically is provided for commutation between day and night rates for call connections within a given distance zone.

The pulse repetition rate of the pulses produced at each of the output terminals 1 . . . $x$ correspond to respectively associated distance zones of call connections which may be completed through the installation. The pulses produced at terminals 1 . . . $x$ may comprise control pulses which operate to generate counting pulses, or which may themselves comprise counting pulses. Each counting pulse represents one charge unit. Thus, for a call connection of a greater distance zone, a pulse repetition rate of higher value is provided than for a call connection of a shorter distance zone in accordance with a higher charge rate per unit time for the more distant call connection. As described more fully hereafter, the control pulses may be of a higher repetition rate than the counting pulses and provide for accumulation of fractional charge units.

Central zone counters are provided and associated respectively with each distance zone for which charge rates are to be determined. In the embodiment of the invention shown, the first central zone counter comprises an auxiliary counter TZ1 for counting fractional charge units and a counter GZ1 for counting whole charge units.

A plurality of central zone counters including auxiliary counters TZ1 . . . TZ*x* and counters GZ1 . . . GZ*x*, respectively, are provided in accordance with the number of distance zones.

The auxiliary counters TZ1 . . . TZ*x* are provided where it is desired to recognize and calculate fractions of a charge unit. For this purpose, the central pulse emitter TG may emit trains of pulses for each of the zones 1 . . . *x* at a pulse repetition rate of a factor (*n*) greater that that of the counting pulses corresponding to the charge units. Each of the first zone counters TZ1 . . . TZ*x* comprises an "*n*-stage" chain or cyclical counter for counting the control pulses and for producing, in response to (*n*) control pulses, an output pulse. The output pulses are applied to the respectively associated counters GZ1 . . . GZ*x* as counting pulses. The counters GZ1 . . . GZ*x* therefore accumulate whole charge units in response to the counting pulses received at the inputs thereof, and the counters TZ1 . . . TZ*x* accumulate *n*th fractions or portions of each such charge unit. Thus, the difference between the totals registered in each of the counters of a given distance zone at the beginning and end of a call connection within that distance zone represents the total number of whole charge units for the call connection plus the *n*th fraction of a charge unit.

The counters of each control zone counter may be constructed in accordance with well known cyclically operating counting chains, as described above, or as sum registers provided with a "1" digit adding means, as described more fully hereafter. The counters GZ1 . . . GZ*x* may comprise decade counters having a register stage for each decade. The decade stages are indicated by the labels E (units), Z (tens), H (hundreds), T (thousands), and ZT (ten thousands), for each of which there is provided a respectively associated output. Alternatively, either or both counters of each zone counter may comprise binary counting mechanisms.

A selection switch D1 is connected with a bank of gates K*z*1 . . . K*zx* of each of the central zone counters and at its input with the central control system ZST to effect read-out of the counters of each central zone counter in response to a pulse from the system ZST. As will be explained more fully, the read-out of the central zone counters is effected at the beginning and at the end call connection corresponding to a given distance zone associated with a respective one of the central zone counters. The outputs of the gates K*z*1 . . . K*zx* of the central zone counters are selectively applied through output terminals to a central register SP. The central register SP further is connected with the central control system ZST to provide for receipt of control signals therefrom and for transmission of registered information thereto in response to such control signals.

The central register SP includes a number of register lines LJ each having a number of stages, indicated by individually labelled segments of the line LJ, for registration of information related to a given call connection. For example, the stages GZ*m* and GZ*e* are provided for registration of the total count accumulation at the beginning and at the end of a given call connection, as derived from the corresponding central zone counter for that call connection.

A controlled transmission or repeater circuit S*t*–U*e* is connected to the central control system ZST and operated thereby upon termination of a completed call connection to transmit information registered in central register SP to a charge register G–SP. A calculator S*ub* is connected with the transmission circuit S*t*–U*e* to determine the difference between the count accumulations registered in stages GZ*m* . . . GZ*e* to determine the total number of charge units for the corresponding call connection. The thus identified total number of charge units may be transmitted to charge register G–SP and registered therein as the actual charge for the call connection.

The charge accumulation system of the invention may be developed as in integral part of a telephone exchange installation and employ the control systems and connection circuits of the latter, thereby to substantially reduce the cost of the charge accumulation system of the invention. Thus, for example, the charge register G–SP and the central zone counters TZ1, GZ1 . . . TZ*x*, GZ*x*, may comprise a portion of the central register SP, if the central zone counters comprise sum registers having associated "1" digit adding circuits. Further, the function of the "1" digit adding circuits and of the calculator S*ub* could be readily performed by the calculating mechanisms provided for program control in register-programmed telephone exchange installations.

The operation of the charge accumulation system of the invention for providing accumulation of charges for call connections at the central installation proceeds as follows. Supervision set A1 may be provided in common for all, or for an associated group of, subscriber stations T*ln* of the exchange installation. When a given subscriber such as T*ln* desires a connection, the supervision set A1 recognizes the condition and announces the connection request to the central control system ZST. The central control system ZST thereupon connects the calling subscriber T*ln* with a free connection set RS over a coupling network KN. A dial tone signal is then transmitted to the calling subscriber of the subscriber station T*ln*. At the same time, the central control system ZST may assign a given register line of the central register SP to the connection circuit thus established. As indicated, the first stage of the register line LJ contains the identifying label RS′ corresponding to the connection set RS connected in circuit with the calling subscriber station T*ln*. Alternatively, each register line, such as LJ, may be permanently assigned to a respectively associated connection set, such as RS. In addition, the central control system ZST effects the registration of the telephone number A of the calling subscriber station T*ln* in the stage of the line LJ labelled A.

Upon receiving a dial tone, the subscriber of subscriber station T*ln* may initiate dialing the number of the called subscriber. The dialing of the dial information code identifying the called subscriber is supervised by supervision set A2, which operates to convey the dial digits of the code over central control system ZST to the central register SP for registration in register line LJ now assigned to the call connection. The telephone number B of the called subscriber is represented by the letter B as being registered in one of the stages of register line LJ.

As soon as the complete calling number B of the called subscriber, or the portion thereof determining the route of the call connection is present, the central control system ZST determines the most favorable connection circuit for completing the demanded call connection and transmits corresponding setting information to the setting system E. In response thereto, the setting system E establishes appropriate connection paths through coupling network KN between the connection set RS and the called subscriber. The called subscriber may be connected directly to the given telephone exchange installation or may be connected to a remote exchange installation; in the latter instance, the connection established by coupling network KN is provided to an external, long distance line of the appropriate route.

The system of the invention also determines a zone identification digit VZ from the calling number B of the called subscriber. The zone identification digit VZ identifies a distance zone representing the actual distance of the call connection. The zone idetification digit VZ derived from calling number B of the called subscriber is registered in the register line LJ of central register SP.

Supervisory system A2 may also operate to recognize answering at the subscriber station of the called subscriber and to indicate to the central control system ZST the completed establishment of the call connection demanded by the calling subscriber T*ln*. Supervision set A2 also may simultaneously transmit to the central control system ZST an address identification signal identifying the connection set RS participating in the call connection. In response to the connection establishment signal and the connection set identification signal, the central control ZST again selects the register line of the central register SP corresponding to the completed call connection, which, in the present example, is the line LJ. The central control system ZST determines the zone identification digit VZ registered in the line LJ and identifying the distance zone of the call connection, and transmits this zone identification digit to the selector switch D1.

The selector switch D1, in response to each such zone identification digit VZ transmitted thereto, produces an output at the one of its output terminals 1′ . . . x′ connected to the output gates Kz1 . . . Kzx of the central zone counter of the corresponding distance zone. Assuming that the distance zone of the completed call connection under discussion is that corresponding to the first central zone counters TZ1 and GZ1, the selector switch D1 produces an output at its terminal 1′ for enabling the associated gates Kz1. The current total accumulated count of each of the counters TZ1 and GZ1 is thereby transmitted to the central register SP and registered in the stage of the corresponding register line LJ as the information GZ*m*.

In a similar manner, the central control system ZST and the supervision circuit A2 may also recognize and respond to termination of the completed call connection to cause selector switch D1 to transmit the then current total accumulated count of the corresponding zone counters for registration as the information GZ*e* in the corresponding register line LJ. Register SP therefore contains in the register line LJ the necessary information for billing the call to the subscriber station T*ln*.

The billing information is transmitted by controlled transmission circuit S*t*–U*e* from the central register SP to an appropriate register position of charge register G–SP, which register position may be permanently assigned to the subscriber station T*ln*. Following transmission of this information, the previously seized connection circuits may be released, such as by central control system ZST, for use in completing subsequent call connection demands.

As noted previously, calculator S*ub* determines the difference between the accumulated counts GZ*m* at the beginning, and GZ*e* at the end of each call connection. The determination of the difference for calculating the actual number of charge units accrued during the call connection is a function of the manner in which the counting pulses are initially registered in the central zone registers.

As discussed previously, each charge unit is defined by a counting pulse and is of a predetermined time duration, or time unit for a given distance zone. The time units are different, of course, for other distance zones. In each case, however, a charge unit is to be registered at the beginning of each time unit. For this purpose, fractions of a charge unit are to be rounded upwardly to a full charge unit. In accordance with the invention, the accumulation of charge units by the central zone counters is independent of the seizure of connection lines and rather proceeds continuously for each distance zone. Thus, the completely of a call connection by answering at the called subscriber station and the subsequent termination of the call connection are not necessarily coordinated to the time units and therefore may each occur at some fractional portion of a charge or time unit. The difference determination for calculating the number of complete charge units and the fraction, if any, of a further charge unit for a given call connection therefore requires a determination of the difference between the count accumulations of each of the fractional and whole charge unit counters, TZ1 and GZ1, at both the beginning and the end of the call connection. Any fraction of a charge unit resulting from the difference determination then is to be rounded upwardly to a full charge unit.

In accordance with a first embodiment of the central zone counters TZ1 and GZ1, the whole charge unit counter GZ1 may count in a decimal manner for each decade and produce an output of decimal digits in successive powers of ten, as indicated by the stages E, Z, H, T and ZT. If the count accumulation of the "*n*-step" or fractional counter TZ1 is to be combined directly with the count accumulation of the whole unit counter GZ1, the "*n*-step" fractional counter TZ1 must also count in a decimal manner. The whole unit count accumulation of the counter GZ1 and the decimal fraction count accumulation of the first counter TZ1 may thereby be directly combined and registered in the stages of register line LJ as the count accumulations GZ*m* and GZ*e* at the beginning and end of the corresponding call connection, respectively, as previously described. The difference calculation by calculator S*ub* then directly indicates the existence of a decimal fraction of a charge unit in which event the charge unit accumulation for the call connection is rounded upwardly to the next full charge unit for registration in charge register G–SP.

In the alternative, counting mechanisms other than of the decimal type may be employed for either or both of the counters TZ1 and GZ1. For example, the fractional counter TZ1 may be a binary counter and the whole unit counter GZ1 may be a decimal counter, or both of the counters TZ1 and GZ1 may be binary counters. In the event that the counters TZ1 and GZ1 are not both decimal counters, it is preferable that the count accumulations of the counters TZ1 and GZ1, as accrued at the beginning and end of a call connection for the corresponding zone, be registered individually and the calculation of the difference therebetween be effected individually. In the event that a difference value other than zero of the accrued counts of the *n*-part counter TZ1 results from the difference calculation, and when that difference is of the same sign as the difference calculation of the accumulated counts of the whole unit counter GZ1, the number of total charge units for the call connection is increased by one unit. Thus, it is only necessary to determine whether the minuend is larger or smaller than the subtrahend in the calculation of the difference values of the accumulated fractional and whole unit counts in determining whether an additional charge unit should be added to the accumulated whole charge units for a given call connection.

The determination of the total number of accumulated charge units for a given call connection normally may be effected after transmission of the charge unit totals GZ*m* and GZ*e* to the charge register G–SP. However, when it is desired that a continuous indication of accumulated charge units be provided at a subscriber station, it is necessary that the determination of the total number of accumulated charge units for a given call connection take place simultaneously with the transmission of the charge unit totals GZ*m* and GZ*e* from the central register SP to the charge register G–SP. Further, this determination must be effected before release of the existing circuit connection to the calling subscriber to be charged with the charge units. For this purpose, the calculating system S*ub* which effects the difference calculation for determining the total number of accrued charge units is connected directly with the control transmission circuit S*t*–U*e* such that the calculated difference value of the total charge units is transmitted to register G–SP.

The system of the invention provides for the controlling of individual subscriber accumulation registers associated with subscriber stations of the installation through the use of the counting pulses which actuate the zone counters of the central charge accumulation system. For this purpose, the outputs of each of the "*n*-step" counters TZ1 . . . TZ*x*, at which the counting pulses are produced are connected additionally to a respectively associated one of the bistable elements BK1 . . . BK*x*. The elements BK1 . . . BK*x*, which may comprise well known flip-flop elements, operate as a buffer stage. The outputs *z*1 . . . *zx* of the flip-flops BK1 . . . BK*x* are connected in common to a mixing gate M2. The gate M2 has an output connected to an input of the central control system ZST.

A counting pulse present at the output of any of the first zone counters TZ1 . . . TZ*x* is effective to set the respectively associated ones of the flip-flops BK1 . . . BK*x*. Each of the flip-flops BK1 . . . BK*x*, when set, produces an output signal which is coupled through mixing gate M2 to the latter's output terminal. The output signal may be termed a count indicating pulse. The count indicating pulse indicates to the central control system ZST the presence of a counting pulse for one of the distance zones, and thus that a counting pulse should be transmitted to the individual subscriber accumulation register of each and every subscriber station connected in a call connection corresponding to that distance zone.

In response to each count indication pulse, the central control system ZST scans, in sequence, each register line of the central register SP to determine all connection sets which are currently participating in a call connection. The central control system ZST performs the scanning in a cyclical manner in synchronism with, and at the rate of the fastest pulse repetition rate of counting pulses. Recognition of an existing call connection may be effected in response to a registered connection set identification, such as RS' of the register line LJ. The connection set identification RS' and the zone identification VZ of the line LJ then are transmitted over the system ZST to a decoder D2.

The decoder D2 includes a plurality of outputs 1'' . . . *x*'' corresponding to the plurality of distance zones and individually selectable in accordance with the zone identification transmitted from the central register SP during the cyclical sequential scan thereof and in sequence for each register line LJ. The decoder D2 produces at the one of its outputs 1'' . . . *x*'', corresponding to the zoning digit VZ received at its input, a command pulse which is applied to the corresponding one of a plurality of coincidence gates K1 . . . K*x*. The coincidence gates K1 . . . K*x* may comprise AND-gates, a first input of each of which is connected to the corresponding one of the output terminals *z*1 . . . *zx* of the bistable elements BK1 . . . BK*x* of the buffer storage stage, and a second input of each of which is connected to the corresponding one of the outputs 1'' . . . *x*'' of the decoder D2.

In operation, for each counting pulse received by the whole charge unit counters GZ1 . . . GZ*x*, the respectively associated one of the flip-flops BK1 . . . BK*x* is set to produce an output pulse at its corresponding output terminal *z*1 . . . *zx* for providing a first enabling pulse to the corresponding one of the coincidence gates K1 . . . K*x*. The actuated one of the flip-flops of the buffer storage stage maintains the first enabling pulse to the associated coincidence gate K1 . . . K*x* for the entire period of the scan of the register lines, such as LJ, of the central register SP. For each register line having a zoning digit VZ corresponding to the distance zone of a currently received counting pulse, which actuated one of the flip-flops BK1 . . . BK*x* to produce an enabling pulse at the associated one of the coincidence gates K1 . . . K*x*, the decoder D2 produces a command pulse which is applied to the second input of the same one of the coincidence gates K1 . . . K*x* to enable the latter. Each enabled one of the coincidence gates K1 . . . K*x* produces an output pulse which is applied through mixing gate M1 to terminal Z*i*. The output at the terminal Z*i* comprises a registration command pulse instructing the central control system ZST to transmit a counting pulse to the individual subscriber accumulation register associated with each calling subscriber currently engaged in a call connection in the corresponding distance zone.

The central control system ZST responds to the registration command pulse to transmit to the supervision set A2 a command pulse for emitting a counting pulse. As described previously, the connection set identification RS' registered in line LJ is transmitted to decoder D2 with the zone identification VZ for each existing call connection. The command to the supervision set A2 therefor provides the address information RS' of the connection set which is connected in a call connection with the subscriber station to the charge accumulation register of which a count pulse is to be transmitted.

The cycle in which occurs the sequential testing of all register lines of the central register SP is very short and, as indicated previously, occurs in a period shorter than that of the fastest pulse repetition rate of the counting pulses. Following each such testing cycle, the flip-flop elements BK1 . . . BK*x* of the buffer storage stage are reset by an output signal from the central control system ZST. The portion of the system of the invention providing for a continuous accumulation of charge units at the individual subscriber circuits is therefore prepared for the next count pulse.

Two or more of the flip-flop elements BK1 . . . BK*x* of the buffer storage stage may be set at one time to provide the simultaneous transmission of count pulses to individual subscriber accumulation registers associated with subscribers stations connected in call connections of two or more distance zones, in accordance with the foregoing description. However, since all flip-flop elements BK1 . . . BK*x* of the buffer storage stage must be reset prior to receipt of a successive count pulse, the cyclical test of register lines, during which the flip-flop elements BK1 . . . BK*x* remain set must be no longer than the shortest period of the pulse repetition rates. Further, all pulse repetition rates pulses must be of the same phase.

This condition for operation of the buffer storage is readily satisfied in accordance with a preferred operation of the central pulse emitter TG. More particularly, each of the trains of count pulses produced for the different distance zones is preferably of a pulse repetition rate of a whole number multiple of a basic pulse repetition rate which may correspond to that of the shortest distance zone. Further, in accordance with conventional pulse repetition rates of counting pulses used in charge accumulation systems, the shortest counting pulse period, i.e., the period of the fastest pulse repetition rate which normally is that of the counting pulses for the greatest distance zone, is considerably larger than the time period requred for effecting each cyclical scan or test of the register lines of the central register SP.

The testing of the register lines LJ of the central register SP for effecting the transmission of count pulses to the individual subscriber accumulation registers may be performed in accordance with the following alternative embodiment of the invention, in which the phase relationship of the various trains of counting pulse trains need not be maintained. In the alternative to the decoder D2, there is provided a comparator circuit having a signal output connected to the terminal Z*i* to provide a registration command pulse to the central control system ZST. A first input of the comparator is connected to the central control system ZST to receive the zone identification information VZ and the corresponding connection set identification information RS' produced in scanning the register lines LJ of the register SP. Further, in the alternative to the coincidence gates K1 . . . K*x* and the mixing gate M1, there is provided a selector switch having a plurality of input terminals to which respectively associated ones of the output terminals *z*1 . . . *zx* of the bistable elements BK1 . . . BK*x*, respectively, are connected.

The operation of this alternative embodiment of the interconnection of the invention proceeds as follows. In response to each counting pulse produced by the central pulse emitter TG for the different distance zones, the respectively associated ones of the bistable elements BK1 . . . BK$x$, are set to produce and maintain a signal at the respectively associated inputs of the selector circuit. Further, the output signals from the set ones of the bistable elements BK1 . . . BK$x$ produce count indicating signals to which the central control system ZST responds, preferably in sequence or in a cyclical manner, to advance the selector circuit through successive contacts. The selector circuit transmits, individually and selectively in accordance with its contact position to which it is currently advanced, each such output signal from set ones of the bistable elements BK1 . . . BK$x$ to the first input of the comparator circuit.

In time coordination with each such output pulse transmitted to the comparator circuit by the selector circuit, the central control system ZST effects a scan of each of the registration lines LJ of the central register SP. The central control system ZST transmits to the second input of the comparator circuit the zone identification digit VZ registered in each registration line LF of the central register SP. The comparator circuit determines the coincidence of the zone identification digit VZ thus transmitted to its second input with the distance zone corresponding to the output signal maintained at its first input terminal and transmitted thereto by the selector circuit from the one of the bistable elements BK1 . . . BK$x$ to which the selector circuit is presently connected. The zone of the signal thus maintained at the first input of the comparator circuit effectively presets the comparator circuit to produce a registration command signal at the terminal $Zi$ only in response to a corresponding zone identification digit for a given call connection. When such coincidence exists, a registration command pulse is produced at the terminal $Zi$ and is applied to the central control system ZST and transmitted by the latter to the supervision and distribution set A2. The set A2, in turn, transmits a count signal to the connection set RS identified by the connection set identification digits RS' of the register lines LJ associated with each such zoning digit VZ for which coincidence is determined by the comparator circuit. The set A2 also, as described previously effects transmission of the counting pulse to the individual subscriber accumulation register of the subscriber station connected in circuit with the thus identified connection set RS.

In accordance with the alternative embodiment of the interconnection system for count accumulation at individual subscriber accumulation registers, the information registered in each register line LJ of the central register SP is scanned for each output pulse from one of the bistable elements BK1 . . . BK$x$ in response to the respectively associated counting pulses transmitted thereto for the corresponding distance zones. After effecting the scan for each individual bistable element BK1 . . . BK$x$, the corresponding bistable element is reset by the central control system ZST or by other suitable means into its holding condition. Since the bistable elements of the buffer storage stage therefore are scanned or interrogated in sequence, the phase relationship of the count pulses required for the interconnection network of the first described embodiment is avoided. As a result, the bistable elements of the buffer storage stage may be set in any sequence, and during a previous but currently maintained setting of another bistable element and during the scanning of the central register SP in response to the output of the previously set bistable element. Each subsequently set bistable element maintains the set condition until subsequent scanning or interrogation thereof by the selector circuit and, following the comparison function of the comparator circuit for determining the transmission of a counting impulse to an individual subscriber accumulation register, is reset to a holding position. The bistable elements therefore may be set and reset in any desired order and the selector circuit may be advanced to the next successive bistable element which currently is in a set condition for determining the generation of registration command pulses. The cyclical scan of the register lines of register SP must be performed at a rate such that it can be completed in response to a count pulse for each distance zone, in sequence, in less time than the shortest period of the pulse repetition rates. Although the cyclical scanning must therefore be more rapid in the alternative embodiment, the counting pulse rates normally employed are sufficiently long to allow for the registration line cyclical scan.

In accordance with either of the alternative embodiments for effecting the transmission of counting pulses to individual subscriber accumulation registers, it is noted that the counting pulses transmitted are identical to those employed for count accumulation in the zone counters. As a result, the determination of a fractional charge unit which is to be rounded to the next higher charge unit for determining the total number of whole charge units for a given call connection is not satisfied. From the previous discussion, the determination of the necessity for rounding upwardly a fractional charge unit to the next full charge unit is effected following completion of the call connection, and upon the read-out of the then current count accumulation of the first and second counters of the corresponding central zone counter corresponding to the distance zone of the call connection. The difference calculation performed by the calculation performed by the calculator S$ub$, as previously described, produces the recognition of a fractional charge unit and the rounding off thereof to the next full charge unit.

The control transmission circuit S$t$–U$e$ is provided with an additional output ($n$) which is connected with the central control system ZST. In response to the rounding off of a fractional charge unit to a full or whole unit by the calculator S$ub$, an output count pulse is produced at the terminal ($n$) which is transmitted by central control system ZST to the appropriate set A2 and connection set RS for registration in the accumulation register of the individual subscriber station connected thereto in a call connection. Preferably, the additional output count pulse is transmitted in the appropriate time sequence of the count pulses for the given distance zones. Thereafter, the call connection sets and circuits employed during the previous call connection, the charge accumulation for which is now completed at both the central and the subscriber registers, are released and are made available for other call connections.

In a given telephone exchange installation, it may occur that only certain ones of the subscriber stations T1$n$ are equipped with individual subscriber charge accumulation registers. In this event, it is desirable to provide a registration stage in each register line LJ of the central register SP, wherein information is registered simultaneously with the registration of the calling number A of a calling subscriber to indicate the presence of an accumulation register at the thus identified subscriber station. During scanning of the registration lines LJ of the central register SP, the information thus registered would limit the operation of the central control system ZST and the interconnection network to provide counting pulses only to subscriber stations equipped with individual accumulation registers.

In summary, the system of the invention provides a highly efficient and effective method for charge accumulation both at central registration elements of a telephone installation and at individual subscriber accumulation registers for indicating the total accrued charge of a call connection. The indication thus provided at the individual subscriber stations represents a continuous accumulation of the charges or charge units through out the duration of a call connection. Thus, a calling subscriber may readily determine the charges for a call as they accumulate. It will be obvious to those skilled in the art that suitable totalizing equipment may be provided both at the central registers and the individual subscriber stations for indicating the accumulated charges for telephone call connections over any desired period. The system of the invention is low in cost and employs a minimum number of conventional circuits. Further, it is readily adapted for use with telephone exchange installations having central control systems. Preferably, the system of the invention is operated through the use of control systems and register equipment normally provided as integral parts of a telephone exchange installation and required therein for completing telephone call connections, regardless of charge accumulation provisions. The sharing of the use of the equipment of the telephone installation for performing certain of the required functions of the charge accumulation system of the invention further reduces the cost thereof and facilitates the operation thereof as an integral part of a centrally controlled telephone exchange installation.

It will be evident that many changes could be made in the system and method of the invention without departure from the scope thereof. Accordingly, the invention is not to be considered limited to the particular embodiments disclosed herein, but only by the scope of the appended claims.

What is claimed is:

1. A method of charge accumulation for call connections in a telephone installation comprising the steps of:

producing trains of counting pulses of different predetermined pulse repetition rates corresponding to different distance zones of call connections, the counting pulses representing charge units for call connections, counting in central zone counters (TZ1, GZ1 . . . TZ$x$, GZ$x$) assigned to respective distance zones the counting pulses of corresponding trains thereof, and determining the difference between count accumulations of the zone counter corresponding to the distance zone of each call connection both when established and when terminated for calculating the total charge units accumulated for each call connection.

2. A method as recited in claim 1 further comprising the steps of producing trains of control pulse of different, predetermined pulse repetition rate corresponding to different distance zones of call connections, producing, in response to ($n$) control pulses of each control pulse train, a counting pulse of a respectively associated counting pulse train, counting the control pulses in "$n$-step" zone counters (TZ1 . . . TZ$x$) assigned to respective distance zones and counting the counting pulses in whole charge unit zone counters respectively associated with said "$n$-step" zone counters for the corresponding distance zones, and calculating the difference between the count accumulations of the associated "$n$-step" and whole charge unit zone counters corresponding to the distance zone of each call connection both when established and when terminated for calculating the total whole charge units and the ($n$th) fraction of a charge unit accumulated for each call connection.

3. A method as recited in claim 2 further comprising the steps of:

counting both the control and counting pulses in decimal "$n$-step" and whole charge unit central zone counters, respectively, for each distance zone, adding the count accumulations of the "$n$-step" and whole charge unit zone counters for the distance zone of each call connection both when established and when terminated for determining the difference therebetween, and for a difference calculation including a decimal portion of a charge unit, increasing the difference calculation of whole charge units by a further charge unit for determining the total charge units for a call connection.

4. A method as recited in claim 2 further comprising the steps of:

determining the difference between the count accumulations of the control and counting pulses of the "$n$-step" and whole charge unit zone counters corresponding to the distance zone of each call connection individually, and for a count difference other than zero of the control pulses and of the same sign as the count difference of the counting pulses, increasing the calculated number of whole charge units by a further charge unit for determining the total charge units for a call connection.

5. A method as recited in claim 1 further comprising the steps of:

registering in a selected one of a plurality of registration lines the distance zone (VZ1 . . . VZ$x$) and the connection set (RS′) of each call connection established by a calling subscriber station associated with the installation, and scanning the registered information lines in response to each counting pulse in the trains thereof for each distance zone to determine and identify call connections existing within the corresponding distance zones, and transmitting a count pulse to an individual subscriber charge accumulation register associated with a calling subscriber station connected in an identified call connection of the corresponding distance zone.

6. A method as recited in claim 5 further comprising the steps of:

scanning the registration lines of existing call connections in sequence in response to each counting pulse of the different distance zones to determine call connections within a distance zone corresponding to the zone of each such counting pulse, and recognizing the address information registered in each such register line related to a call connection in a corresponding distance zone for identifying the calling subscriber station and transmitting to the individual subscriber charge accumulation register associated therewith a count pulse.

7. A method as recited in claim 5 further comprising the steps of:

establishing and maintaining a first enabling signal in response to each individual and to each simultaneously occurring counting pulse of the trains thereof corresponding to different distance zones, scanning the registration lines relating to existing call connections and producing a second enabling pulse for each such call connection in accordance with the zone identification thereof registered in the related registration line, and determining coincidence of the first and second enabling pulses of corresponding distance zones for transmitting a counting pulse to the individual subscriber charge accumulation register associated with the calling subscriber station of the installation connected in the call connection identified by each such register line.

8. A method as recited in claim 5 further comprising the steps of:

producing trains of control pulses of different, predetermined pulse repetition rates corresponding to different distance zones of call connections, producing, in response to ($n$) control pulses of each control pulse train, a counting pulse of a respectively associated counting pulse train, counting the control pulses in "$n$-step" zone counters (TZ1 . . . TZ$x$) assigned to respective distance zones and counting the counting pulses in whole charge unit zone counters respectively associated with said "*n*-step" zone counters for the corresponding distance zones, calculating the difference between the count accumulations of the associated "*n*-step" and whole charge unit zone counters corresponding to the distance zone of each call connection both when established and when terminated for calculating the total whole charge units and the (*n*th) fraction of a charge unit accumulated for each call connection, transmitting a further counting pulse to the individual subscriber charge accumulation register of a calling subscriber station in response to a difference calculation including an *n*th fraction of a charge unit, and releasing the calling subscriber station from the call connection following transmission of the last counting pulse to the individual charge accumulation register thereof.

9. A method as recited in claim 1 further comprising the steps of:

commutating the application of counting pulse trains of different predetermined pulse repetition rates to the central zone counters (TZ1, GZ1 . . . TZ*x*, GZ*x*) to pulse trains of appropriately different predetermined pulse repetition rates for each distance zone for which the charge unit rate is to be changed.

10. A charge accumulation system for a telephone installation comprising:

first means (TG, TN) having a plurality of ouputs (1 . . . *x*) for generating at each of said outputs (1 . . . *x*) a train of control pulses of different, respectively corresponding predetermined pulse repetition rates in accordance with different distance zones of call connections which may be completed from said installation, a plurality of central zone counters (TZ1, GZ1 . . . TZ*x*, GZ*x*) assigned to respective distance zones and responding to the control pulses as counting pulses for accumulating charge units for the associated distance zone, a central control system (ZST) and a central register (SP) said central control system (ZST) transmitting to a selected one of a plurality of register lines (LJ) of said central register (SP) address information (RS′) and a zone identification (VZ) of a calling subscriber station and responding to the establishment and termination of a cell connection for a given calling subscriber station to transmit to the corresponding register line (LJ) of the central register (SP) the count accumulations (GZ*m*, GZ*e*) of the zone register (TZ1, GZ1 . . . TZ*x*, GZ*x*) of the corresponding distance zone at the establishment and the termination of the call connection, and calculator means (S*ub*) for determining the difference between the accumulated counts (GZ*m*, GZ*e*) at the beginning and the termination of each call connection for calculating the total charge units accumulated therefor.

11. A system as recited in claim 10 wherein:

each of said central zone counters includes an "*n*-step" counter (TZ1 . . . TZ*x*) and a whole charge unit counter (GZ1 . . . GZ*x*), said "*n*-step" counters (TZ1 . . . TZ*x*) receiving the control pulses from said first means (TG, TN), said first means (TG, TN) producing the plurality of control pulse trains at pulse repetition rates of a factor (*n*) greater than the corresponding counting pulse trains for each distance zone, and said "*n*-step" counters (TZ1 . . . TZ*x*) each producing a counting pulse in response to (*n*) control pulses received thereby for application to said respectively associated whole charge unit counters (GZ1 . . . GZ*x*), and said calculator means (S*ub*) calculating the difference between the count accumulations of the "*n*-step" counters (TZ1 . . . TZ*x*) and the whole charge unit counters (GZ1 . . . GZ*x*) corresponding to the distance zone of each call connection for accumulating the total charge units of the *n*th fraction of a further charge unit for each call connection.

12. A system as recited in claim 11 wherein:

each of said "*n*-step" counters (TZ1 . . . TZ*x*) comprises a repeating decimal counter and each of said whole charge unit counters (GZ1 . . . GZ*x*) comprises a decade counter, and there is further provided means (SP) for adding the count accumulations of the (*n*) factor counters (TZ1 . . . TZ*x*) and the whole charge unit counters (GZ1 . . . GZ*x*) prior to the calculation of the difference of the counts accumulated thereby at the establishment and at the termination of a call connection in a corresponding distance zone.

13. A system as recited in claim 10 wherein there is further provided:

selector means (D1) having a plurality of output terminals (1′ . . . *x*′) corresponding to the plurality of distance zones and having an input terminal for receiving a zone identification signal for effecting readout of central zone counter of the distance zone corresponding to the zone identification signal, and said central control system (ZST), in response both to the establishment and to the termination of a call connection, recognizes the registration line (LJ) of the central register (SP) related to the call connection to identify the address of the call connection and the distance zone thereof for applying the corresponding registered zone identification signal to said selector means (D1) for reading out the accumulated count of said central zone counters (TZ1, GZ1 . . . TZ*x*, GZ*x*).

14. A system as recited in claim 13 wherein there is further provided:

control means (S*t*–U*e*) and a central charge register (G–SP), said calculator means (S*ub*) being connected to said central register (SP) and to said central charge register (G–SP) to transmit the information registered in a register line (LJ) thereof in response to termination of the call connection identified by the call connection address (RS′) of the register line (LJ) to said central charge accumulation register (G–SP), and said calculator means (S*ub*) being connected to said control means (S*t*–U*e*) for determining the difference between the register count accumulations (GZ*m*, GZ*e*) corresponding to the establishment and the termination of the call connection related to each such registration line (LJ) for transmitting the accumulated charge units for the given call connection to said central charge accumulation register (G–SP).

15. A system as recited in claim 10 wherein there is further provided:

a buffer storage stage including a bistable switching element (BK1 . . . BK*x*) connected to receive the counting pulses of each train thereof corresponding to the difference zones and to be set in response to each such counting pulse to produce and maintain an output signal, a plurality of gate means (K1 . . . K*x*) respectively associated with said bistabel means (BK1 . . . BK*x*) to receive the output signals thereof, decoder means (D2) having a plurality of outputs (1″ . . . *x*″) connected to said gate means (K1 . . . K*x*) and an input connected to said central control system (ZST) and responsive to a zone identification signal applied to the input thereof by said central control system (ZST) for producing a command pulse at an output thereof corresponding to the applied input zone identification signal, said central control system (ZST) responding to an output signal from one of said bistable elements (BK1 . . . BK*x*) to scan the registration lines (LJ)

of said central register (SP) in sequence for transmitting to said decoder means (D2) the zone identification signal (VZ) registered in each of said register lines (LJ) in sequence, said decoder means (D2) transmitting a command pulse from the corresponding output terminal thereof to the corresponding one of the gates (K1 . . . K*x*) in response to each received zone identification signal, and said gates (K1 . . . K*x*) transmitting an output pulse in response to coincidence of a command pulse from said decoder means (D2) and an output signal from the corresponding one of said bistable means (BK1 . . . BK*x*) for producing a registration command pulse for commanding the transmission of a counting pulse to the individual subscriber accumulation register of each subscriber station (T*ln*) connected in a call connection within a distance zone corresponding to the enabled one of the gates (K1 . . . K*x*).

References Cited

UNITED STATES PATENTS

| | | | |
|---|---|---|---|
| 2,200,796 | 5/1940 | Lill et al. | 179—7.1 |

FOREIGN PATENTS

| | | |
|---|---|---|
| 855,975 | 12/1960 | Great Britain. |
| 1,016,189 | 1/1966 | Great Britain. |

KATHLEEN H. CLAFFY, Primary Examiner

J. S. BLACK, Assistant Examiner